April 8, 1941. R. A. THIENEMANN 2,237,378
ASSEMBLED GAUGE
Filed April 21, 1938
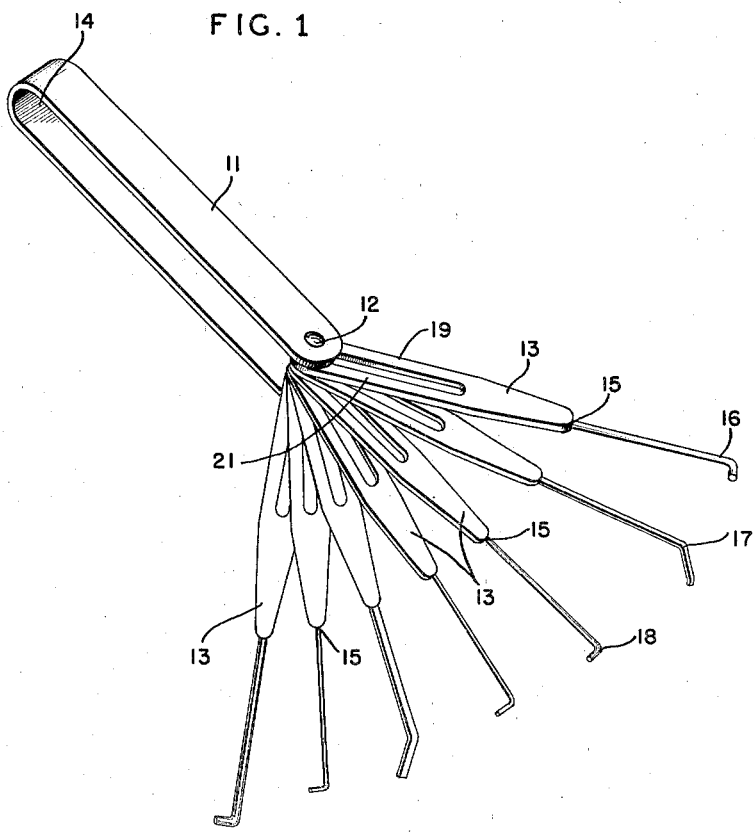
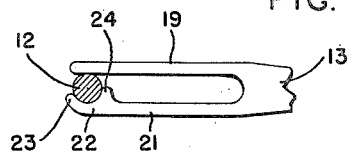
INVENTOR.
ROLF A. THIENEMANN
BY
*J. H. B. Whitfield*
ATTORNEY.

Patented Apr. 8, 1941

2,237,378

UNITED STATES PATENT OFFICE 2,237,378

ASSEMBLED GAUGE

Rolf A. Thienemann, Chicago, Ill., assignor to Teletype Corporation, Chicago, Ill., a corporation of Delaware Application April 21, 1938, Serial No. 203,359

2 Claims. (Cl. 7—16)

The present invention relates to improvements in tool assemblies and more particularly to pivoted tool holders and severable articulations therefor.

Apparatus which partakes of the intricacy of printing telegraph machines periodically requires field adjustment. Many vital dimensions concerning particularly the adjustments of spacing, clearance, etc., in various types of commercial printer units lend themselves readily to standardization. It has been found expedient in such cases to have available a set of adjustment gauges preferably assembled in a certain significant order with each gauge relating to and being particularly designed to accommodate one or perhaps several of said adjustments. To facilitate the adjustment of this equipment a manual of instruction is supplied in which reference is made to appropriate gauges for the proving of corresponding adjustments. The gauges which differ from each other in most instances by but slight though significant proportions are sometimes expeditiously referred to in manuals of instruction by their ordinal sequence in an assembly. Also, in different apparatus the same gauges may assume a different position in an assembly.

The present invention contemplates an arrangement of parallelly held adjustment gauges supported in a holder having a handle within which delicate gauges may be serviceably disposed by swinging them about a supporting pivot. In the manufacture of several classes of this general type of apparatus, corresponding ones of the dimensions may vary from those of other units. Not infrequently specific adjustments may be required to accommodate local operating conditions. In order that a set of gauges appropriate for each case may not have to be assembled and carried in stock, it is proposed to make each gauge and its carrier member or shank yieldably separable from the main body or holder.

Another object in designing for the separability of each gauge from the holder is to render it more mobile so as to enable an adjuster to reach into limited or confining spaces, or to minimize the weight of the gauge in order that his "touch" may be more sensitive. Each one of these elements, when separated from the assembly, possesses the proper weight characteristics so that for critical adjustment there will be but very little mass, which may therefore be held lightly.

Accordingly, it is proposed to provide an assembled set of gauges in which each gauge carrier is separable from the assembly, so that the sequence or arrangement of the gauges may be changed, or so that special dimensioned gauges may be substituted to suit special circumstances.

A main object of the present invention is to provide assembled gauges which may be readily removed for use, that are simple and economical to manufacture, and ones which are rugged and serviceable.

In order to attain these and other objects of the present invention, there is provided in accordance with one adaptation thereof a substantially U-shaped handle member, whose free ends are secured together by means of a pivot stud, making the holder member rigid and integral. The space between the side portions of the handle determines, of course, the number of tools which may be admitted. Each tool or gauge is comprised of a standard shank portion to which is riveted or otherwise secured the particular measuring extremity, gauge, etc. It is contemplated that a set of gauges be assembled in a certain predetermined order in accordance with a manual of instructions, each gauge being individually identified by its ordinal sequence in the assembly.

For a more comprehensive understanding of the present invention, reference may be had to the accompanying drawing and to the following detailed specification wherein like reference characters designate corresponding parts throughout, and wherein Fig. 1 is a perspective view of a series of adjustment gauges assembled in a tool holder having the features and advantages of the present invention, and Fig. 2 is a detailed plan view of one of the tool holder shanks showing a manner of articulation to the pivotal stud.

Referring now more particularly to the accompanying drawing, the reference character 11 denotes a supporting handle or holder formed to a U-shaped configuration from a strip of metallic substance having its ends secured together by means of the rivet stud 12. The intermediate or shaft portion of the rivet 12, see Fig. 2, is preferably of cylindrical formation. Its length is dependent upon the combined thickness of the several tool shanks 13, as is also the curvature 14 of the handle member 11, in order that there may be maintained parallelism between the two side portions of said handle.

The supporting bodies or shanks 13 are similar in profile, but may vary in thickness. At the remote extremity of each shank 13, in the proximity of the region indicated 15, there is secured to each shank a gauge or standard, some of which have been indicated 16, 17, and 18. These members, which constitute the gauges proper, may be formed of round stock or of flat strip or of any other suitable material consistent with the particular use to which the gauge is designed. At their pivotal ends, the shanks 13 are bifurcated and formed with a pair of tines specifically indicated 19 and 21.

The tine 19 is straight and parallels the main body portion of its cooperating tine 21. The extremity of the latter member, however, is profiled so as to provide a small segment or claw 22, the internal curvature of which is designed to conform with the circumference of the pivot shaft 12. Lobes 23 and 24 define the extremity of each segment 22, the inner lobe 24 being somewhat longer than the outer one 23. The inherent resiliency within the tines 19 and 21, permit of their being spread apart sufficiently so that the foremost lobe 23 may spring around the circumference of the pivot shaft 12, but the rearmost lobe 24 will act as a positive stop. A proper degree of tension may be afforded by the cooperation of tines 19 and 21 with the shaft 12, so that when any of the shanks 13 are rotated into an extended position of their associated gauge, the maintenance of this position may be assured by the frictional engagements of said tines with shank 12 and in part also by the frictional contact between any one of the shanks 13 and its adjacent one or ones. It is to be noted also that the frictional gripping by all of the shanks 13 maintains them against shifting longitudinally of the stud shaft 12 so that when any one or more of the gauges together with its shanks is removed, the remaining ones do not move together to occupy the position of such removed gauges, but instead the vacancy left thereby is maintained so that inadvertent transposition of the tools may be avoided.

It is proposed that various assemblies of said gauges may be arranged by selecting from a supply stock different combinations of gauges 16, 17, 18, etc., and their integral shanks 13 which may then be slipped into position upon the shaft 12 of a suitable holder or handle 11. Also, it will be convenient in a manual of instruction or maintenance to be able to refer to the different adjustment gauges by their order of assembly. Equally advantageous will be the separability of any one of the gauges from its shank 13 in the event that such gauge becomes damaged requiring replacement. Generally, gauges and spacer devices of this type are susceptible to damage or distortion. To prevent the inadvertent damage to or destruction of any of the gauge extremities, they may be rotated about pivot 12 so as to dispose the delicate gauge elements 16, 17, etc., within the shelter of the handle 11.

While the present invention has been explained and described with reference to a particular embodiment thereof, it is to be understood, nevertheless, that numerous changes and modifications may be made without departing from the spirit and scope thereof. The inventive concept is to be measured therefore in accordance with the hereunto appended claims.

What is claimed is:

1. An article of manufacture comprising a plurality of gauging implements each secured to an individual holder, said holders each formed of relatively rigid bar metal with a longitudinal cutout to afford parallel springable tines which are thicker in their common plane than they are at right angles to said plane and one of which is shaped to present a segmental claw facing the other one of said tines, a U-shaped handle including parallel and coincident side portions, and a cylindrical tie post having substantially the same radius as the inner surface of said claw but being of a slightly greater diameter than the maximum distance between said claw inner surface and said other one of said tines, securing said side portions at their free ends and providing intermediate said side portions a pivot upon which may be sprung the parallel tines of each of said holders with said claw partially embracing said pivot post for thereby supporting its said implement under pivotal tension.

2. In combination, a holder and protective sheath for pluralities of implements comprised of a double strap having parallel sides, a cylindrical pivot post secured across the free ends of said sides, a plurality of supporting shanks each having a gauging implement endmost thereof and each formed with parallel springable tines, one of said tines terminating with a segmented claw of a radius substantially the same as that of said pivot post and facing the other one of said tines, both of said tines formed integrally with their said shank of relatively rigid material thicker in their common plane than they are at right angle to said plane so as to resist elastically against a spreading force during application upon said post and so as to grip said post under tension for the purpose of maintaining its relative position longitudinally of said post.

ROLF A. THIENEMANN.